(12) United States Patent
Jackson et al.

(10) Patent No.: US 8,264,704 B2
(45) Date of Patent: Sep. 11, 2012

(54) METHOD OF AUTOMATICALLY CONTROLLING PRINT QUALITY IN DIGITAL PRINTING

(75) Inventors: Mark Sennett Jackson, Rochester, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1065 days.

(21) Appl. No.: 11/897,212

(22) Filed: Aug. 29, 2007

(65) Prior Publication Data
US 2009/0059266 A1 Mar. 5, 2009

(51) Int. Cl.
*G06K 15/00* (2006.01)
(52) U.S. Cl. ............ 358/1.14; 358/1.9; 358/504; 399/49
(58) Field of Classification Search .................... 358/1.9, 358/3.23, 406, 1.15; 399/49, 341, 301; 347/2, 347/262, 116; 382/112
See application file for complete search history.

(56) References Cited

U.S. PATENT DOCUMENTS

| | | | |
|---|---|---|---|
| 6,178,007 B1* | 1/2001 | Harrington | 358/1.9 |
| 6,563,524 B1* | 5/2003 | Regimbal et al. | 347/116 |
| 6,744,531 B1* | 6/2004 | Mestha et al. | 358/1.9 |
| 6,819,352 B2 | 11/2004 | Mizes et al. | |
| 7,090,324 B2 | 8/2006 | Mizes | |
| 7,095,531 B2 | 8/2006 | Mizes et al. | |
| 7,125,094 B2 | 10/2006 | Mizes | |
| 7,126,705 B1* | 10/2006 | Novick et al. | 358/1.15 |
| 7,206,532 B2 | 4/2007 | Lofthus et al. | |
| 7,505,173 B2* | 3/2009 | Viturro et al. | 358/1.9 |
| 7,800,779 B2* | 9/2010 | Fan et al. | 358/1.9 |
| 2004/0095454 A1* | 5/2004 | Maeda | 347/116 |
| 2004/0130737 A1* | 7/2004 | Kamimura et al. | 358/1.9 |
| 2004/0239747 A1* | 12/2004 | Maeda | 347/116 |
| 2005/0117926 A1* | 6/2005 | Tanaka et al. | 399/49 |
| 2005/0238374 A1* | 10/2005 | Yoshida | 399/49 |
| 2006/0045577 A1* | 3/2006 | Maeda | 399/301 |
| 2006/0067756 A1* | 3/2006 | Anderson et al. | 399/341 |
| 2006/0067757 A1* | 3/2006 | Anderson et al. | 399/341 |
| 2006/0114313 A1* | 6/2006 | Moore | 347/262 |
| 2006/0115284 A1* | 6/2006 | Grace et al. | 399/49 |
| 2006/0244980 A1* | 11/2006 | Grace | 358/1.9 |
| 2006/0256394 A1* | 11/2006 | Mashtare | 358/406 |
| 2006/0256404 A1* | 11/2006 | Yamada | 358/504 |
| 2006/0284905 A1* | 12/2006 | Spencer | 347/2 |
| 2006/0285134 A1* | 12/2006 | Viturro et al. | 358/1.9 |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Twyler Haskins
*Assistant Examiner* — Nicholas Pachol
(74) *Attorney, Agent, or Firm* — Fay Sharpe LLP

(57) ABSTRACT

A method of automatically monitoring and controlling print quality in digital printing with a first and second scanner capturing an image from different locations in the printing engine. In an exemplary embodiment, a first scanner captures an image from a surface internal to the print engine while an external scanner captures an image from a printed sheet. If the external print image quality is acceptable, the internally captured image is saved as a reference. The system periodically compares internally captured images with the saved reference and provides automatic image correction if the variation from the reference is within a correctable range. If the image variation is not within a correctable range, the system runs a new test print and creates a new reference image.

16 Claims, 3 Drawing Sheets

U.S. PATENT DOCUMENTS

| | | | |
|---|---|---|---|
| 2007/0003302 A1* | 1/2007 | Mizes | 399/49 |
| 2007/0242287 A1 | 10/2007 | Banton et al. | |
| 2007/0263239 A1* | 11/2007 | Miyata | 358/1.9 |
| 2008/0037069 A1* | 2/2008 | Mestha et al. | 358/3.23 |
| 2008/0137914 A1* | 6/2008 | Minhas | 382/112 |
| 2008/0152371 A1* | 6/2008 | Burry et al. | 399/50 |
| 2009/0003656 A1* | 1/2009 | Reinhard et al. | 382/112 |

OTHER PUBLICATIONS

Desmond Fretz, "Cluster Printing Solution Announced", Today at Xerox (TAX), No. 1129, Aug. 3, 2001.

\* cited by examiner

METHOD OF AUTOMATICALLY CONTROLLING PRINT QUALITY IN DIGITAL PRINTING

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. Pat. No. 7,206,532, Issued Apr. 17, 2007, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. 20031468-US-NP, Published Sep. 28, 2006, entitled IMAGE QUALITY CONTROL METHOD AND APPARATUS FOR MULTIPLE MARKING ENGINE SYSTEMS," by Michael C. Mongeon;

U.S. Publication No. US-2006-0221362-A1, Published Oct. 5, 2006, entitled "PRINTING SYSTEM," by Paul C. Julien;

U.S. Publication No. US-2006-0222393-A1, Published Oct. 5, 2006, entitled "PRINTING SYSTEM," by Jeremy C. deJong, et al.;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0233569-A1, filed Oct. 19, 2006, entitled "SYSTEMS AND METHODS FOR REDUCING IMAGE REGISTRATION ERRORS," by Michael R. Furst, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2006-0280517-A1, Published Dec. 14, 2006, entitled "WARM-UP OF MULTIPLE INTEGRATED MARKING ENGINES," by Bryan J. Roof, et al.;

U.S. Publication No. US-2006-0291927-A1, Published Dec. 28, 2006, entitled "GLOSSING SUBSYSTEM FOR A PRINTING DEVICE," by Bryan J. Roof, et al.;

U.S. Publication No. US-2007-0002403-A1, Published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, Published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. Publication No. US-2007-0024894-A1, Published Feb. 1, 2007, entitled "PRINTING SYSTEM," by Steven R. Moore, et al.;

U.S. Application Publication No. US-2007-0052991-A1, Published Mar. 8, 2007, entitled "METHOD AND SYSTEMS FOR DETERMINING BANDING COMPENSATION P U.S. Pat. No. 7,660,460, issued Feb. 9, 2010, entitled "GAMUT SELECTION IN MULTI-ENGINE SYSTEMS," by Wencheng Wu, et al.;

U.S. Pat. No. 7,636,543, issued Dec. 22, 2009, entitled "RADIAL MERGE MODULE FOR PRINTING SYSTEM," by Barry P. Mandel, et al.; and, U.S. Pat. No. 7,826,090, issued Nov. 2, 2010, entitled "METHOD AND APPARATUS FOR MULTIPLE PRINTER CALIBRATION USING COMPROMISE AIM," by R. Victor Klassen.

BACKGROUND

The present disclosure relates to digital printing and particularly to printing processes in which the physical image-forming material such as, for example, dry powder toner in a xerographic marking engine is rendered into at least a portion of the desired final image on some internal member such as, for example, a photoreceptor or passive receiver element and subsequently transferred to the final substrate. In such printing it has been found difficult to maintain the quality of the printed image, particularly for color prints where slight variation in color or color uniformity can render the print unacceptable to the customer.

A well-known technique for controlling print quality is the rendering of test images of the physical image-forming material and their measurement within the machine. Such measurements are then compared to some desired reference value and any difference used to determine adjustments to the printing process. Such test images may be of greater or lesser extent and may be measured in various ways, as, for example, for average value, or for uniformity over an extended area. The rendering of test images may require the interruption of the printing of the desired images, or may be arranged to take place while printing proceeds, as, for example, by rendering test images between the desired images. The measurement process itself may be affected by variation in the characteristics of the internal member or the sensor used for such measurement.

Such internal measurements may not, however, be capable of monitoring all aspects of print quality for which control is necessary or desired, for example defects due to variation in the transfer of images to the final substrate. A well-known technique for detecting and correcting for such defects is the measurement of test prints. Such measurement can take place using a sensor or sensors within the marking engine disposed so this can take place after the final step in the printing process, such as fusing, or by using an external scanner or other sensor. The production of such test prints requires the interruption of useful printing and therefore results in a reduction in marking engine productivity and consumes substrate material thereby increasing the cost of such measurements.

It has thus been desired to minimize the disadvantages of these two approaches, so as to provide better control of print quality and to reduce the cost, both in substrate material and lost productivity, of such control.

BRIEF DESCRIPTION

The present disclosure addresses the above described disadvantages of known print quality monitoring techniques and describes a digital image printing process in which a print engine is used for printing on print media from a digital image supplied to the print engine. In one exemplary embodiment, the print engine is of the electrostatic type employing a photoreceptor. In another exemplary embodiment, the print engine is generalized and may employ, for example, an ink jet printer. Provision is made for continuously and automatically monitoring the quality of the printing by capturing an image from one location or stage in printing, such as a test print, and capturing an image at the same time from a second location or stage, such as a surface internal to the print engine; and, if the captured image from the one location, such as a test print, is satisfactory, the image captured at the second location, such as an internally captured image, is saved as a reference. Subsequently, images may be captured on a running basis from the internal surface and compared with the reference. If the comparison yields a variation within an acceptable range, no correction is required. If the comparison of the running image from the internal surface is variant from the saved reference image, a control signal is generated to effect digital correction of the imaging to yield a desired print. However, if the comparison yields a variation that is not correctable internally by automatic digital changes, a new test print is run and a new test image is taken from the internal surface and a new reference image is saved. Thus, the system of the present disclosure can automatically monitor and correct deviations of print quality in digital image printing without the need to stop the print job for the purpose of running a test print and separately scanning the image from the test print. The method of the present disclosure thus provides for improved productivity and minimizes waste in a digital printing system.

DETAILED DESCRIPTION

Figure 1:
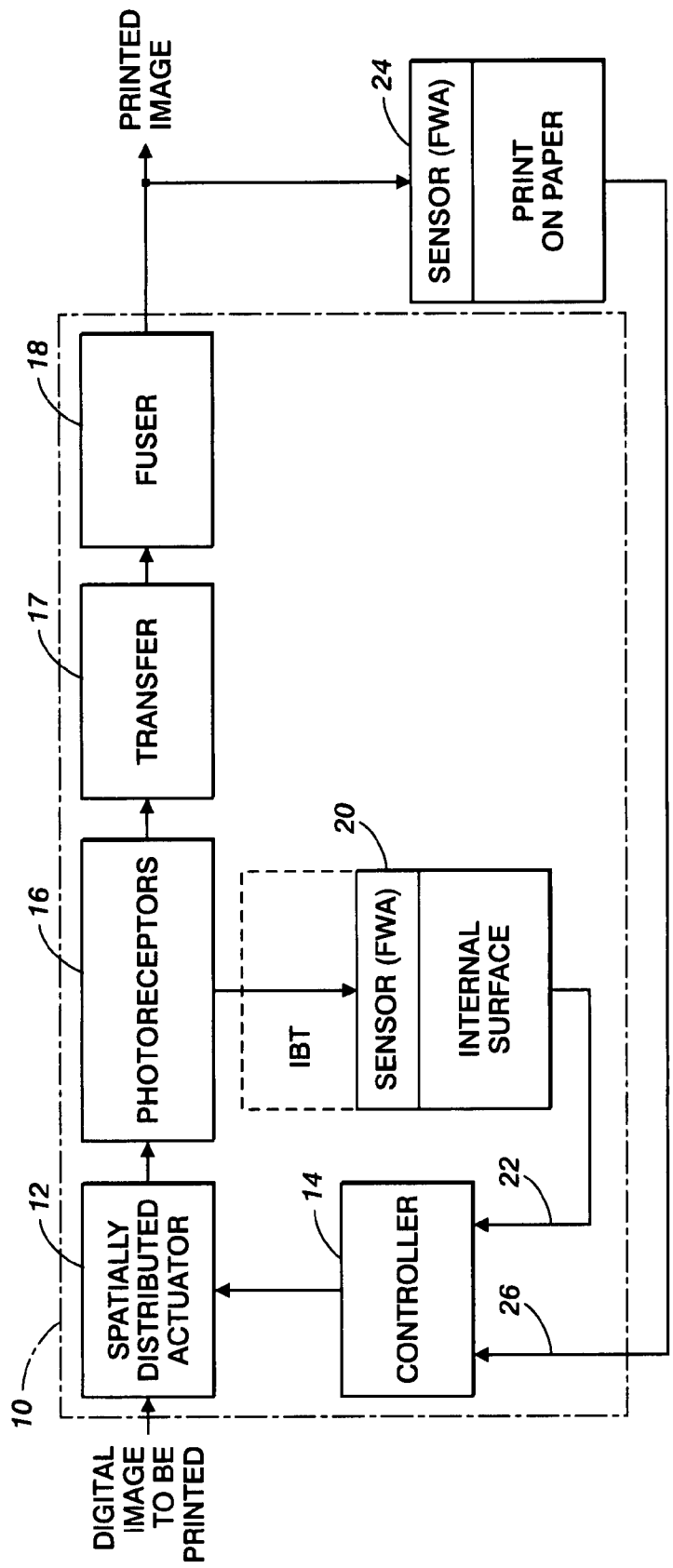
FIG. 1 is a block diagram of an exemplary electrostatic print engine employing the method of the present disclosure.

Referring to FIG. 1, a print engine, indicated generally at 10 in dashed outline, is of the type receiving a digital image to be printed into a spatially distributed actuator 12 which is controlled by a controller 14 and actuator 12 may be of the well known raster optical scanner variety for creating an image on a photoreceptor 16. The print engine may also be a xerographic print engine, a solid ink print engine or a multiple engine printing system. In electrostatic or xerographic printing processes, the image from the photoreceptor 16 is transferred to a print media sheet as denoted at block 17 and is secured thereon by a fuser 18 to produce a final printed image. A sensor 20 is disposed to optically measure an image on an internal surface provided within the print engine 10 and the sensor 20 outputs a signal indicative thereof along line 22 to a controller 14. In the present practice, it has been found suitable to employ a full-width array scanner or reduction optic scanner for sensor 20; however, a single or multiple translatable sensor may also be employed. Optionally, the internal surface may be formed on an intermediate belt denoted by the characters IBT as shown in dashed outline in FIG. 1. Alternatively, the sensor 20 may be disposed on a photoreceptor drum a photoreceptor belt an intermediate drum an imaging drum, an imaging belt and print media.

An external sensor 24 optically measures the image printed on a test sheet and outputs a signal indicative thereof along line 26 to the controller 14. In the present practice, sensor 24 may comprise a full-width array, reduction optics, or a translatable single or multiple sensor arrangement. The sensors may also be point sensors, reflectance measuring sensors, density sensors or color parameter measuring sensors.

Figure 2:
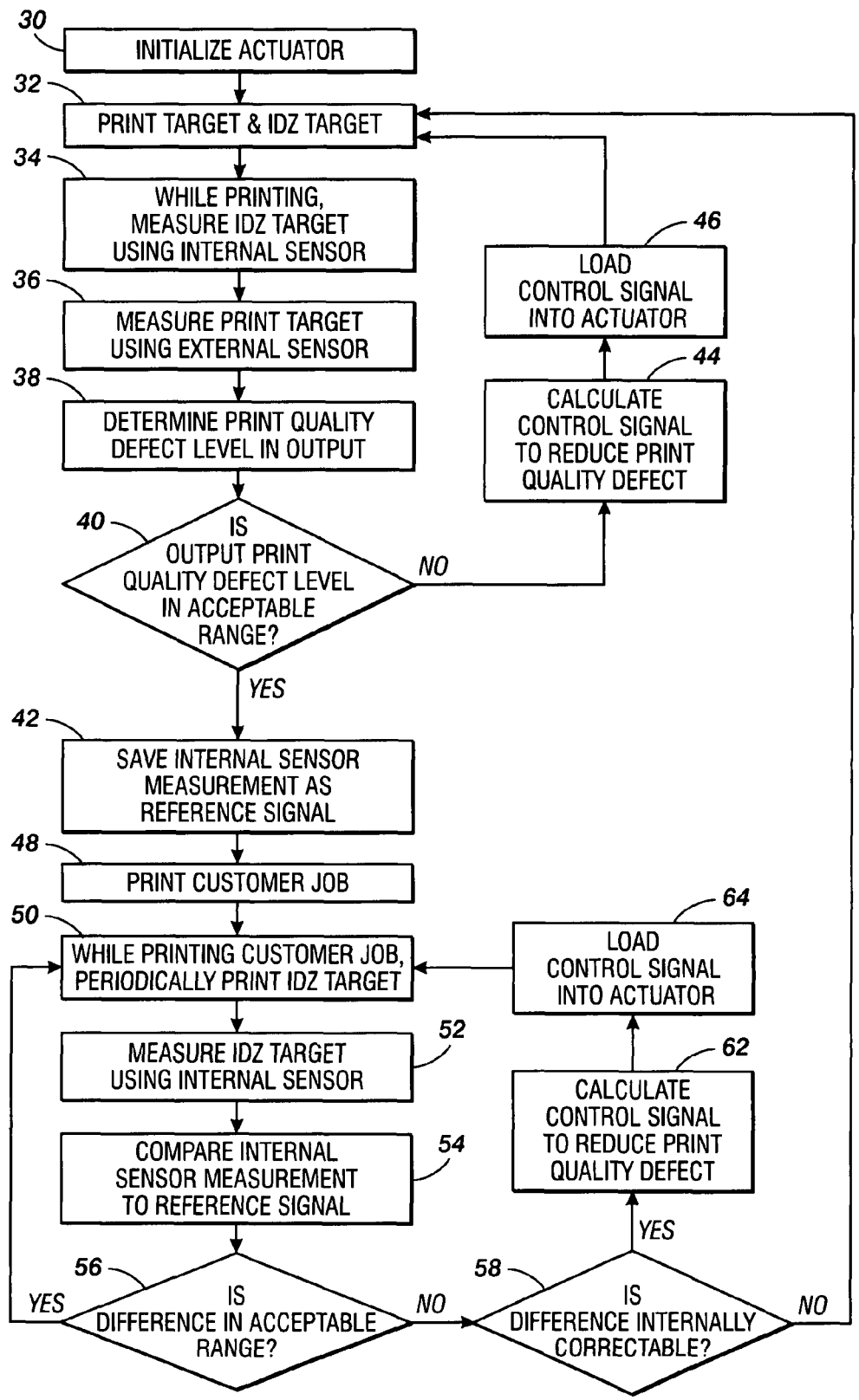
FIG. 2 is a block flow diagram of the method of the present disclosure.

Referring to FIG. 2, the method of operation of the print engine system 10 of FIG. 1 is indicated, wherein the spatially distributed actuator 12 is initialized at step 30. The system proceeds to create a print target and inter-document zone (IDZ) target image at step 32; and, while printing the target image in step 32, proceeds to step 34 and measures the IDZ target with the sensor 20.

The system then proceeds to step 36 and measures the target print using external sensor 24. The system then proceeds to step 38 and determines the print quality defect level in the signal outputted from sensor 24.

The system then proceeds to step 40 and makes a determination as to whether the print quality defect (PQ) level determined in step 38 is within an acceptable range. If the determination in step 40 is in the affirmative, the system proceeds to step 42 and saves the internal sensor measurement of step 34 as a Reference Signal. If the determination in step 40 is negative, the system proceeds to step 44 and calculates a control signal to reduce the print quality defect; and, the control signal of step 44 is then loaded at step 46 into the actuator 12 by returning to step 32; and, the system repeats the process through to step 40 until the determination there is affirmative. The system then proceeds from step 42 to print the customer job at step 48.

While printing the customer job, the system at step 50 periodically renders an IDZ target and proceeds to step 52 to measure the target using the internal sensor 20. The result of the target measuring step 52 is then compared with the Reference Signal saved at step 42.

The system then proceeds to step 56 and asks the question whether the difference between the measured comparison of step 54 is within an acceptable range; and, if the answer is affirmative, the system then returns to step 50.

However, if the determination at step 56 is negative, the system proceeds to step 58 and asks whether the difference is internally correctable. If the determination at step 58 is affirmative, the system then calculates at step 60 a control signal to reduce the print quality defect; and, at step 64 loads the control signal of step 62 into the actuator and returns to step 50.

However, if the determination at step 58 is negative, the system returns to step 32.

Figure 3:
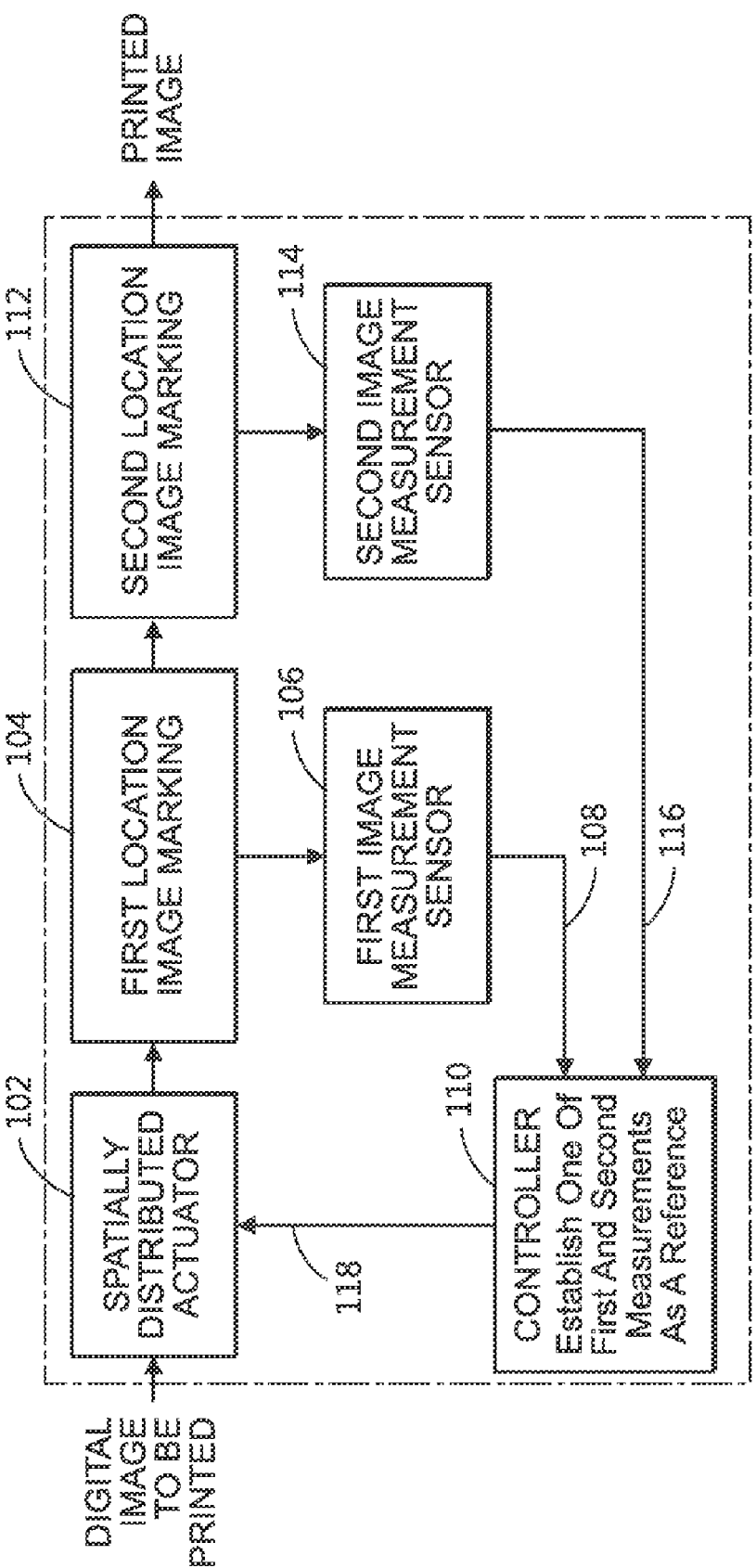
FIG. 3 is an exemplary embodiment of a generalized print engine employing the method of the present disclosure.

Referring to FIG. 3, a more generalized exemplary version of the method of the present disclosure is illustrated wherein a print engine is employed which may be any of the solid ink print engine, multiple engine printing system and of the type employing an ink jet or laser printer. A spatially distributed actuator at step 102 receives the digital image to be printed, such as, for example, by electronic input by a computer or a scanner (not shown). The image is marked at a first location at step 104 within the print engine, or at a first stage in the printing process; and, a first image measurement is taken thereupon at step 106 by a suitable first sensor at step 106. The measurement taken at step 106 is then inputted along line 108 to a controller at step 110.

The printing process is continued from step 104 to a second location at step 112 and a second image measurement is then taken by a second sensor at step 114 and this measurement is also inputted along a line 116 to the controller at step 110. Either of the first or second sensor may be a full width array sensor, a reduction optic sensor, a translating array sensor, a multiple array sensor, or a two-dimensional array sensor. The controller at step 110 then is operative to establish one of the first and second measurements as a reference and to initiate a control signal along line 118 for controlling the actuator at step 102. Also, at step 110, the measurement of the image at one of the first and second location is held as a reference. The choice of measurement location for the reference may be based upon which measurement location is upstream in the printing process and to thereby provide greater and earlier opportunity for correction of quality defects by the controller.

The present disclosure thus describes a method of automatically monitoring digital image printing for print quality and correcting the print image internally within the print engine without interrupting the print job.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of automatically controlling digital printing of a document print job on media sheets comprising:
   (a) providing a print engine;
   (b) disposing a first sensor at a first location external to the print engine for measuring an image printed on a media sheet by the engine;
   (c) disposing a second sensor at a location upstream in the print process of the first sensor for measuring an image on a surface internal to the print engine of one of a photoreceptor drum, a photoreceptor belt, an intermediate drum, an intermediate belt, and an imaging drum;
   (d) while printing measuring an image on the surface internal to the print engine with the second sensor;
   (e) printing the measured image on a media sheet;
   (f) subsequently measuring the printed image on the media sheet with the first sensor;
   (g) automatically periodically determining a performance metric of the image printed on the media sheet and, if acceptable, saving the measurement of the corresponding image measured on the surface internal to the print engine from the second sensor as a reference, and if not acceptable, automatically calculating and applying a control signal and repeating steps (d)-(f);
   (h) executing the print job and automatically periodically measuring an image on the surface internal to the print engine at the upstream location using the second sensor and comparing with the saved reference; and,
   (i) automatically repeating steps (d)-(g) if the comparison in step (h) is not within an acceptable range; and, continuing the print job if the comparison of step (h) is within an acceptable range.

2. The method defined in claim 1, wherein the step of disposing a first and second sensor includes disposing two dimensional array image sensing devices.

3. The method defined in claim 2, wherein the step of disposing a first and second sensor includes disposing one of: a full width array sensor, a reduction optics sensor, a translating array sensor, and a multi-array sensor.

4. The method defined in claim 1, wherein the step of measuring an image on the printed sheet and the step of measuring an image on an internal surface includes measuring the same colorant at different locations in the printing process.

5. The method defined in claim 4, wherein the step of disposing a first and second sensor includes disposing two dimensional array image sensing devices.

6. The method defined in claim 1, wherein if the comparison in step (g) is within an acceptable range, calculating a control signal based upon the deviation of the image on the internal surface from the saved reference image applying the control signal and continuing the print job.

7. The method described in claim 1, wherein the step of measuring an image on a surface internal to a print engine includes measuring without interrupting the print job.

8. A method of digital printing of an image comprising:
   (a) providing a print engine with multiple locations to sense an image during printing;
   (b) disposing a first sensor and measuring a printed image at a first location external to the engine during printing;
   (c) disposing a second sensor and measuring an image at a second location upstream of the first sensor and internally of the print engine during printing;
   (d) while printing measuring the image at the location in the printing process using the second sensor;
   (e) printing the measured image on a media sheet;
   (f) measuring the printed image at the first location in the printing process with the first sensor; and,
   (g) automatically periodically determining if the image quality measured at the first location is acceptable and if affirmative, automatically storing the corresponding measured image at the second location as a reference signal and if not, automatically periodically repeating the measurements.

9. The method defined in claim 8, wherein the step of disposing a first and second sensor includes disposing two dimensional array image sensing devices.

10. The method defined in claim 8, wherein the step of disposing a first and second sensor includes disposing at least one of: a full width array sensor, a reduction optics sensor, a translating array sensor, and a multi-array sensor.

11. The method of claim 8, wherein the step of disposing a first sensor includes disposing a sensor on one of a photoreceptor drum, a photoreceptor belt, an intermediate drum, an intermediate belt, an imaging drum, an imaging belt, and print media.

12. The method of claim 8, wherein the step of disposing a first and second sensor includes disposing point sensors.

13. The method of claim 8, wherein the step of disposing a first and second sensor includes disposing at least one of: a reflectance measuring sensor, a density sensor, and a color parameter measuring sensor.

14. The method of claim 8, wherein the print engine is at least one of: a xerographic print engine, a solid ink print engine, and a multiple engine printing system.

15. The method defined in claim 8 further comprising:

calculating a control signal based on measurements of a printed image obtained from the first sensor at the first location and from the second sensor at the second location; and, applying the control signal to the printing and improving a performance metric of the printing process.

16. The method defined in claim 8, wherein the step of measuring a printed image at a fixed location in the printing process and the step of measuring a printed image at a second location in the printing process includes measuring the same image.

* * * * *